Oct. 2, 1962 W. E. LANHAM ET AL 3,056,482
BREAD HANDLING APPARATUS
Filed Feb. 20, 1959 2 Sheets-Sheet 1
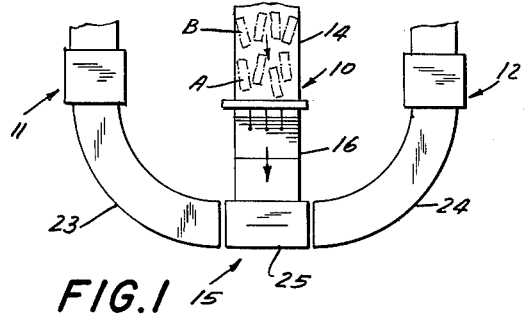
FIG.1
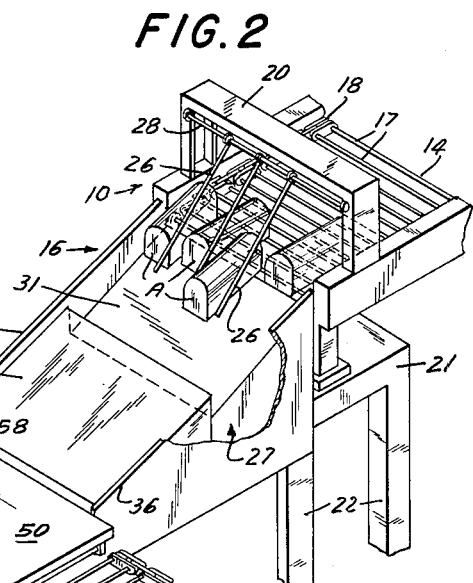
FIG.2
FIG.3
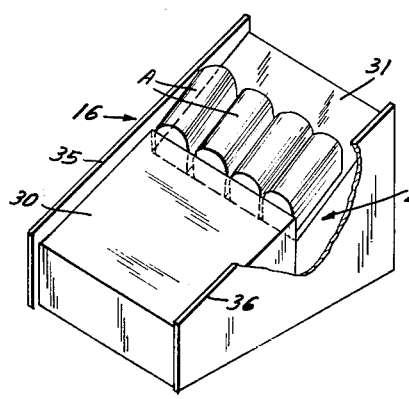
FIG.4
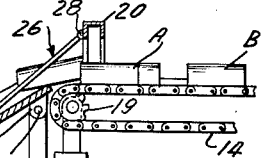
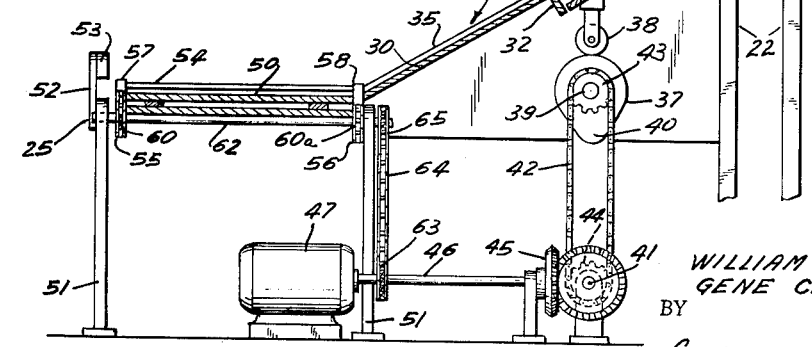
INVENTORS.
WILLIAM E. LANHAM
GENE C. MILLER
BY
Curtis, Morris & Safford
their ATTORNEYS Oct. 2, 1962    W. E. LANHAM ET AL    3,056,482
BREAD HANDLING APPARATUS
Filed Feb. 20, 1959    2 Sheets-Sheet 2

INVENTORS.
WILLIAM E. LANHAM
GENE C. MILLER
BY
Curtis, Morris & Safford
their ATTORNEYS

United States Patent Office 3,056,482
Patented Oct. 2, 1962

3,056,482
BREAD HANDLING APPARATUS
William E. Lanham, 3456 Woods Drive, and Gene C. Miller, 3540 Woods Drive, both of Decatur, Ga.
Filed Feb. 20, 1959, Ser. No. 794,549
11 Claims. (Cl. 198—30)

The present invention relates to apparatus for handling bread and other bakery products and more particularly to a conveyor system for rearranging loaves from a side-by-side relationship as received from one processing apparatus to a single line relationship for delivery to another processing apparatus.

Bread is baked in individual pans and, to facilitate handling, a plurality of pans, for example four or five, are strapped together in one unit. After the bread is baked it is dumped from all of the pans of a unit onto a conveyor. Thus, the plurality of loaves from each pan unit are arranged in a general parallel side-by-side relationship across the conveyor, but the loaves are not necessarily arranged in perfect alignment. In other words, the individual loaves from each pan unit may be arranged at an angle to their direction of movement and some of the loaves may be positioned ahead of other loaves of the group.

In order to properly condition the loaves for a slicing and/or wrapping operation the product must be properly cooled. Preferably, the loaves are cooled in the manner described and claimed in U.S. Letters Patent of William E. Lanham No. 2,758,391, issued August 14, 1956, and entitled "Bread Cooling System." As disclosed in this patent the loaves are cooled as they are transported on the conveyor on which they have been dumped from the pan units. After the loaves have been cooled, they are delivered to a slicing and/or wrapping machine.

As the loaves are arranged four or five abreast in successive groups on the conveyor during cooling, it is necessary to rearrange the loaves into a single line for delivery to a slicing and/or wrapping machine. One such apparatus for rearranging the loaves is described and claimed in a copending application of William Lanham, Serial No. 577,340, filed April 10, 1956, entitled "Bread Handling Apparatus" which will issue as Patent No. 2,877,883 on March 17, 1959. This apparatus comprises high speed conveyors each adapted to receive one of the loaves of a group and space them apart a distance greater than the length of a loaf, slower speed conveyors for receiving other loaves of the group and guiding means for directing the loaves from the slower moving conveyors between the spaced loaves on the higher speed conveyors. Thus, a plurality of loaves are realigned from a side-by-side to an in-line arrangement. The apparatus for rearranging loaves as described and claimed in said application is used extensively in commercial installations and operates satisfactorily. However, the apparatus has a number of moving parts, requires a number of conveyors and different drives for operating the conveyors at different rates of speed.

One of the objects of the present invention is to provide an improved apparatus of simplified construction for rearranging loaves of bread or other bakery products from a parallel side-by-side relation as received from one processing apparatus into a single line for delivery to another processing apparatus. Another object is to provide an apparatus of the type indicated which operates automatically to rearrange loaves without crushing or otherwise damaging the product as it is conveyed from one processing apparatus to another. Another object is to provide an apparatus of the type indicated which is adaptable to a great variety of conditions of installation and operation which are encountered in different bakeries throughout the country. Still another object of the invention is to provide an apparatus for rearranging loaves as they are conveyed from one processing apparatus to another which is of simple and compact construction, economical to manufacture and a thoroughly practical construction which will maintain steady and reliable operation to continuously convey loaves in proper alignment to a slicing and wrapping machine.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a plan view of a conveyor system incorporating the present invention for transporting loaves from one processing apparatus, such as a cooler, to another processing apparatus, such as a slicing and wrapping machine or machines;

FIGURE 2 is a perspective view of the conveyor system and showing the intermediate chute for receiving a plurality of loaves arranged in side-by-side relation from one conveyor and delivering the loaves in a single-line to another conveyor;

FIGURE 3 is a perspective view of the chute illustrated in FIGURE 2 and showing a plurality of loaves of a group intercepted and held in the chute;

FIGURE 4 is a side elevational view of the conveyor system and showing the lift plate in the chute and its operating mechanism;

Figure 5:
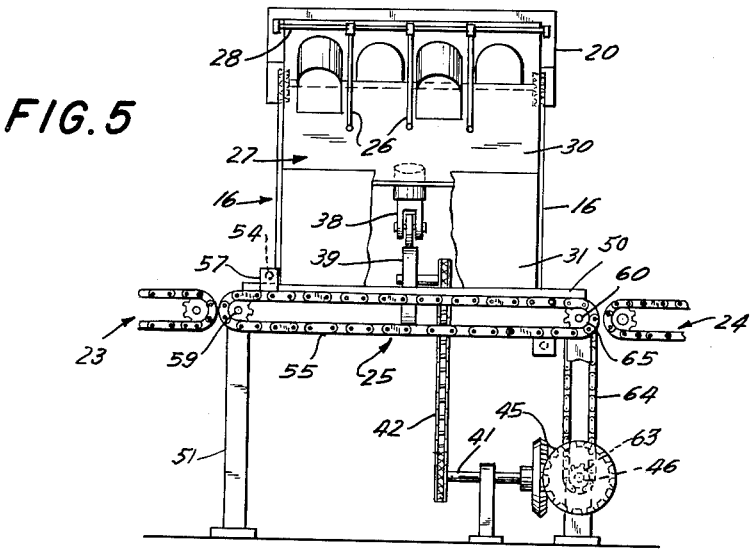
FIGURE 5 is a front elevational view of the conveyor unit at the lower end of the chute and showing the flight bar and its operating mechanism for sweeping a group of loaves laterally from in front of the chute.
Figure 7:
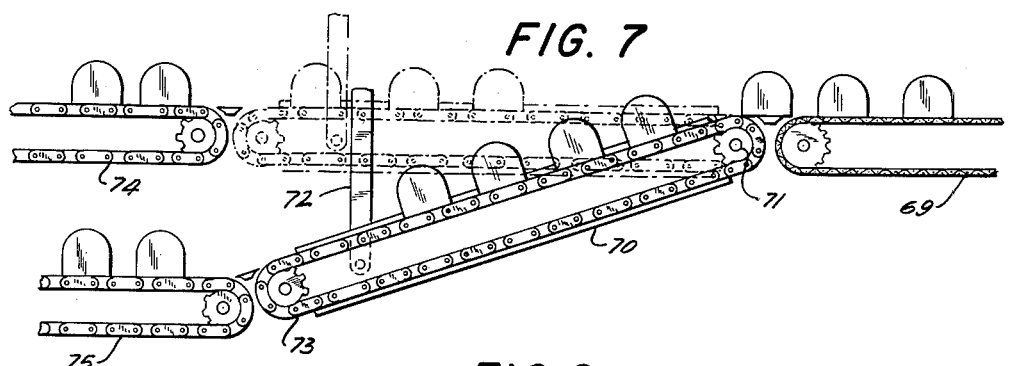
Figure 6:
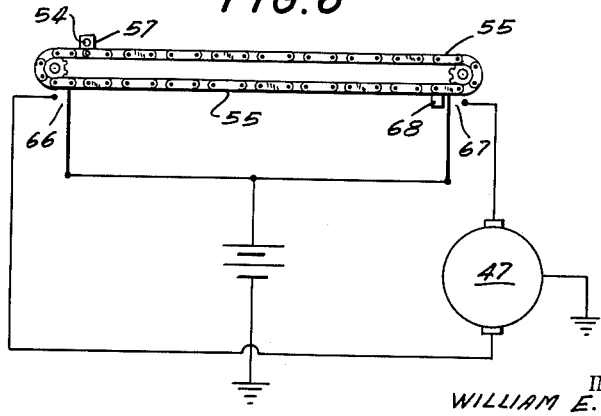

FIGURE 6 is a view similar to FIGURE 5 showing a modified construction for reversing the drive to sweep groups of loaves alternately in opposite directions onto laterally moving conveyors for delivery to separate slicing and wrapping machines; and FIGURE 7 is a side elevational view of a conveyor arrangement of modified construction for alternately delivering loaves to separate conveyors for delivery to separate slicing and wrapping machines.

Referring to FIGURE 1 of the drawing, the invention is shown applied to a conveyor system for transporting loaves of bread or other bakery products from one processing apparatus, such as a cooler, at a station 10 to other apparatus, such as slicing and/or wrapping machines, at stations 11 and 12. As illustrated diagrammatically in FIGURE 1 the conveyor system comprises a first conveyor 14 on which the loaves are transported during cooling, a second conveyor complex 15 movable in a path at right angles to the path of the first conveyor for conveying loaves to the slicing and/or wrapping machines at stations 11 and 12, and a chute 16 between the conveyors 14 and 15.

The leaves are arranged in successive groups A, B, etc., with four or five loaves in each group as dumped from the pan units. As the loaves are dumped from the pan units onto the conveyor 14 they are arranged in a generally longitudinal side-by-side relationship abreast of each other in each of the groups A, B, etc. While the loaves of each group A and B are generally parallel, the individual loaves of a group may be slightly inclined to their direction of movement and to each other and out of line laterally. However, the groups of loaves A, B, etc., are spaced from each other along the conveyor 14 as illustrated in FIGURE 1. The groups of loaves A, B, etc., are delivered to the chute 16 successively where the loaves of each group are rearranged in properly spaced parallel relation and then delivered onto the conveyor 15 one after the other for movement laterally in a single line.

The conveyor 14 may be of any suitable construction and in the illustrated embodiment is of the type described and claimed in a copending application for Letters Patent of William Lanham, Serial No. 497,521, filed March 29, 1955, and entitled "Conveyor Belt." This type of belt comprises a plurality of parallel rods 17 connected at each end by links 18 which cooperate with the ends of the rods to form races engaged by sprockets 19 to drive the conveyor, see FIGURE 4. Overlying the end of the conveyor 14 is a gantry frame 20. The end of the conveyor 14 in the illustrated embodiment is supported by a frame 21 having legs 22. It will be understood that the conveyor 14 travels in a continuous path with the loaves mounted thereon to cool the product and the end of the conveyor at station 10, as illustrated in FIGURE 2, constitutes one processing apparatus where the product is cooled.

The transverse conveyor 15 which moves in a path at right angles to the path of movement to the conveyor 14 may comprise a single conveyor operable in one direction, or may comprise a plurality of adjacent conveyors 23 and 24 operable in either of two directions as described and claimed in the application of William Lanham, Serial No. 577,340, referred to above, for delivering loaves to either one or the other of the slicing and wrapping machines at the stations 11 and 12, or both. In the illustrated embodiment an intermediate conveyor 25 is provided between the conveyors 23 and 24 for delivering loaves to either one or the other of the conveyors. Each of the conveyors 23 and 24 are of a construction substantially identical to the first conveyor 14.

In accordance with the present invention the chute 16 is inclined downwardly between the end of the first conveyor 14 and the second conveyor 15 for rearranging loaves of successive groups into a single lines of loaves. Depending guides 26 overlie the end of the conveyor 14 and the upper end of chute 16 for straightening and spacing the loaves of each group as they enter the chute. Intercepting mechanism 27 cooperates with the chute and has a barrier engaged by the front ends of the loaves of a group to properly align the loaves of a group and hold the loaves of each group until the loaves of the preceding group have been moved laterally from the lower end of the chute. The intercepting mechanism 27 is operated intimed relation to the second conveyor 15 to release the loaves so that they will slide onto the second conveyor at the rear of the previous groups to form a single line of loaves moving laterally, one after the other, to a slicing and/or wrapping machine at station 12 or 13.

The guides 26 are in the form of pivoted rods hanging from a cross-bar 28 supported by the gentry frame 20. The guide rods 26 divide the upper end of the chute 16 into separate stalls so that the loaves of a group are directed between the rods as they are delivered from the end of the conveyor 14. Guide rods 26 at the sides of a loaf tend to straighten the loaf as it is moved forwardly into the chute by the conveyor 14. If a particular loaf is so turned on the conveyor 14 so that its forward end engages a guide rod 26, the latter tends to hold the loaf while it is pushed by the conveyor 14 and by the other adjacent loaves into a parallel relation with the other loaves of a group to position its forward end between adjacent guide rods. The spaced pivoted guide rods 26 depending from cross-bar 28 thus function to properly position the loaves of a group in a spaced parallel arrangement as they enter the chute 16. In the illustrated embodiment, the rods 26 have loops formed at the upper ends which surround the cross-bar 28 on which they pivot.

The intercepting mechanism 27 may comprise any suitable mechanism forming a barrier extending across the chute and which may be moved relative to the chute 16 to intercept and hold a group of loaves and release the group of loaves for delivery to conveyor 15. In the illustrated embodiment the chute itself forms the intercepting mechanism. To this end, the bottom of the chute 16 comprises a stationary inclined plate 30 and a movable plate 31. As shown in FIGURE 4, the upper edge of the stationary plate is folded downwardly to provide a flange 32 constituting a barrier. The movable plate 31 has a transverse shaft 33 at its upper end journaled in bearings 34 on the frame 24 for rocking movement from the position illustrated in FIGURE 4 to a position in alignment with and forming a continuation of the stationary plate 30. Thus, the loaves A of a group delivered by the conveyor 14 slide down the inclined movable plate 31 until their forward ends engage the barrier 32. The barrier 32 aligns the forward ends of the properly spaced parallel loaves of a group and holds the loaves in the position illustrated in FIGURE 3. Chute 16 has side plates 35 and 36 projecting upwardly above the stationary and movable plates 30 and 31 to form guide rails for the outermost loaves of a group.

The movable plate 31 of chute 16 is intermittently lifted from the position illustrated in FIGURES 2 to 4 to release the loaves of a group which then slide down the stationary plate 30 onto the transverse conveyor 15. The movable plate 31 may be lifted by any suitable operating mechanism and in the illustrated embodiment the lifting mechanism comprises a cam 37 and cam follower on a lift rod 38 connected to the forward end of movable plate 31. The cam 37, see FIGURE 4, is mounted on a shaft 39 rotatable in bearings in the side plates 35 and 36. Cam 37 has a lobe 40 which extends through an arc of approximately 60° to lift the movable plate 31 of the chute. Thus, during 300° of rotation of shaft 39 the barrier 32 of the intercepting mechanism 27 is operative to receive and hold the loaves of a group on chute 16 and during rotation of the shaft through some arc less than 60°, the cam lifts plate 31 to release the loaves for delivery to the second conveyor 15. Cam shaft 39 is driven from a counter-shaft 41 through a chain 42 and sprockets 43 and 44 and the countershaft, in turn, is driven by bevel gears 45 from a shaft 46 driven by motor 47.

Unit 25 of the second conveyor 15 comprises a table 50, see FIGURES 2, 4 and 5, supported by frame 51. As shown in FIGURE 4, the left hand side of the frame 51 has brackets 52 which support a bumper rail 53 engaged by the ends of the loaves to limit their outward movement as they slide down the chute 16 onto the table 50 of the conveyor unit 25. The loaves of a group on the table 50 are swept laterally onto conveyor 23 or 24 by a flight bar 54 extending across the table 50 and above the surface thereof. Flight bar 54 is operated by chains 55 and 56 at opposite sides of the table, see FIGURE 4. The chains 55 and 56 each have a bracket 57 and 58 projecting from one of the links which mount the ends of the flight bar 54. Each chain 55 and 56 is mounted in sprockets 59, 60 and 59a, 60a at each end of the table 50, see FIGURE 2, so that the flight bar 54 moves laterally across the table then back under the table to repeat a cycle. The sprockets 59 and 59a for one end of the chains 55 and 56 are mounted on a shaft 61 while the driving sprockets 60 and 60a are mounted on a shaft 62 and the shafts are journaled in the frame 51, see FIGURE 4. As illustrated in FIGURE 5, two of the flight bars 54 are mounted on the chains 55 and 56 so that one flight bar is being returned while the other flight bar is moving a group of loaves across the table. When all of the loaves are to be delivered to the slicing and wrapping machine at the station 12, the chains 55 and 56 are driven so that the flight bars move from the left toward the right as viewed in FIGURE 2.

The lift plate 31 of the intercepting mechanism 27 is operated in timed relation to the movement of flight bars 54 across the table 50 so that one group of loaves A will have been swept laterally away from the lower end of the chute 16 before the lift plate is operated to release the next group of loaves B. Any suitable timing arrangement may be used for driving the flight bars 54 and cam 37 for actuating the lift plate 31. In the illustrated embodiment, chains 55 and 56 for operating the flight bars 54 are driven by the same motor 47 and/or drive shaft 46. As shown in FIGURES 4 and 5, a sprocket 63 is mounted on the drive shaft 46 which operates through a chain 64 and sprocket 65 on shaft 62 to drive the flight bars 54 in synchronism with the lift cam 37. It will be understood that the driving arrangement is such that one flight bar 54 will sweep a group of loaves across the table 50 before the lift plate 31 is raised to release the next group of loaves for delivery onto the table 50. The opposite flight bar 54 then will have moved up over the end of the table 50 and sweep the second group of loaves in the same direction. One form of apparatus incorporating the novel features of the present invention having now been described in detail, the mode of operation is explained as follows:

Loaves of bread of one group A are delivered by the conveyor 14 to the top of the chute 16. As the loaves enter the top of the chute 16 the pivoted depending guide bars 26 straighten the loaves and position them in parallel spaced relationship. The group of loaves then slide down the inclined movable plate 31 of chute 16 until their forward ends engage the barrier 32 at the rear of the stationary plate 30 as shown in FIGURE 3. The loaves of the group are held by the barrier 32 of the intercepting mechanism 27 until the flight bar 54 has completed its pass across table 50 to sweep the preceding group of loaves laterally from the table as, for example, to the right onto the conveyor 24. After the flight bar 54 has swept across the table 50, cam 37 lifts the lower end of the movable plate 31 of chute 16 to release the loaves of the next group held by barrier 32 which then slide down the stationary inclined plate 30 onto the table 50. The loaves of this group are then positioned on the table 50 at the rear of the preceding group in a single row and arranged to be swept by the next flight bar 54 toward the right onto the conveyor unit 24. Thus, the groups of loaves are rearranged from the four abreast alignment in chute 16 as illustrated in FIGURE 3 to an in-line arrangement on the conveyor 24 for delivery to station 12. When desired, the direction of rotation of the motor 27 may be reversed to deliver the loaves of successive groups onto the conveyor 23 for delivery to station 11.

A modified arrangement of the conveyor unit 25 is illustrated in FIGURE 6 in which a single flight bar 54 moves alternately in opposite directions across the table 50 to deliver successive groups of loaves to each of the conveyor units 23 and 24, respectively. As shown in FIGURE 6, the flight bar 54 is mounted in brackets 57 and 58 projecting from one of the links and chains 55 and 56 as previously described. In this arrangement, however, the motor 47 is reversed as the flight bar 54 completes its movement in either direction across the table 50. The motor 47 is controlled by limit switches 66 and 67 at each end of the conveyor unit 25 which are actuated by a lug 68 depending from one of the chains 55 and 56. For example, if the flight bar 54 is moved from the left toward the right as viewed in FIGURE 6 to sweep a group of loaves onto conveyor unit 24, see FIGURE 2, the switch operating lug 68 moves from the right toward the left until it engages and closes limit switch 66. Closing of limit switch 66 reverses the direction of rotation of the motor 47 and operating through the driving mechanism reverses the direction of movement of the chains 55 and 56. Flight bar 54 then moves from the right to the left to sweep the next group of loaves onto the conveyor 23. Thus, the control mechanism operates automatically to reverse the direction of movement of the flight bar 54 and the delivery of successive groups of loaves to the conveyors 23 and 24, alternately.

FIGURE 7 illustrates another modified arrangement for delivering loaves of successive groups to one or the other of two processing stations such as slicing and/or wrapping machines. With this arrangement, the successive groups of loaves A and B delivered to the conveyor unit 25 from chute 16 are conveyed laterally in one direction onto a conveyor unit 69 of wire mesh which acts as a collector conveyor. Adjacent the end of conveyor unit 69 is a conveyor unit 70 pivotally mounted at one end on a shaft 71 to adapt the opposite end 73 of the unit to be raised and lowered by lifting bars 72. The movable end 73 of the conveyor unit 70 is adapted to align with two other conveyor units 74 and 75 for delivering loaves of bread to two separate stations having separate slicing and/or wrapping machines. The lift bars 72 may be operated by any suitable mechanism, such as the cam 37 and follower 38, illustrated in FIGURE 4, for alternately raising and lowering the pivoted intermediate conveyor unit 70 into alignment with the separate conveyor units 74 or 75. The operating mechanism may be controlled by a clock to deliver bread to each conveyor 74 and 75 alternately for a predetermined period of time, or may be controlled in accordance with the demand at each slicing and/or wrapping station. During the shifting of conveyor 70, its direction of rotation is reversed to prevent crushing and maintain control of the product. Thus, the loaves will be fed onto conveyor 69 from opposite directions for a short period of time during the shift over. However, the wire mesh conveyor 69 will permit relative slippage to prevent damage to the product. It will be understood that the pivoted intermediate conveyor unit 70 may be moved into alignment and held to deliver all of the loaves of successive groups to the conveyor unit 74 in a single line or lowered and held to deliver all of the loaves to the conveyor unit 75 if so desired.

It will now be observed that the present invention provides an improved apparatus of simplified construction for rearranging loaves of bread or other bakery products from a parallel side-by-side relation as received from one processing apparatus. It also will be observed that the apparatus of the present invention will operate automatically to rearrange loaves as they are conveyed from one processing apparatus to another without crushing or otherwise damaging the product. It will still further be observed that the present invention provides an apparatus for rearranging loaves as they are delivered from one processing apparatus to another which is of simple and compact construction, adapted to accommodate the great variety of conditions of installation encountered in different bakeries, and one which is economical to manufacture and thoroughly practical to maintain steady and reliable operation for continuously conveying loaves in proper alignment to slicing and wrapping machines.

While several forms of the invention are herein illustrated and described it will be understood that further modifications may be made in the construction and arrangement of elements without departing from the spirit or scope of the invention. Therefore, without limitation in this respect the invention is defined by the following claims.

We claim:

1. Apparatus for rearranging loaves of bread or other bakery products from a side-by-side to an in-line relationship while being conveyed from one processing apparatus to another comprising, in combination, a first conveyor for conveying loaves from the first processing apparatus in side-by-side relationship in successive groups, at least one second conveyor for delivering loaves to the other processing apparatus in an in-line relationship, and a transfer unit comprising an inclined chute for receiving the successive groups of loaves from the first conveyor which slide down the chute by gravity, intercepting mechanism having a barrier extending across the chute between the upper and lower ends thereof for engagement by the front ends of the plurality of loaves to hold the plurality of loaves of a group on the chute, means for operating the intercepting mechanism intermittently, means at the lower end of the chute for receiving and conveying a group of loaves laterally from the bottom of the chute to the second conveyor, and a common driving means for operating the last named means and intercepting mechanism in timed relation to hold each group of loaves on the chute until the previous group has been moved away from the lower end of the chute.

2. Apparatus for rearranging loaves of bread or other bakery products from a side-by-side to an in-line relationship while being conveyed from one processing apparatus to another comprising, in combination, a conveyor on which loaves are arranged in successive groups, a second conveyor movable in a direction at right angles to the first conveyor, an inclined chute between the first and second conveyors, depending guides overlying the end of the first conveyor and chute for straightening and spacing the loaves as they move from the first conveyor into the chute to position them in spaced parallel relationship in the chute, intercepting mechanism having a barrier engaged by the front end of the loaves as they slide down the inclined chute to hold the loaves of a group in parallel arrangement, means for operating the intercepting mechanism to release the plurality of loaves of a group simultaneously which slide onto the second conveyor for movement laterally in a single line, and means for driving the second conveyor and operating means for the intercepting mechanism in timed relation to deliver successive groups onto the second conveyor, one after the other, to form a single continuous line of loaves.

3. Apparatus in accordance with claim 1 in which the bottom of the inclined chute comprises a lower stationary plate and an upper movable plate, the intercepting mechanism comprising a shoulder at the upper edge of the stationary plate, and the operating means for the intercepting mechanism raising the movable plate into alignment with the upper edge of the stationary plate to release the loaves which slide downwardly on the stationary plate of the chute.

4. Apparatus in accordance with claim 3 in which the movable plate of the chute is pivotally mounted for rocking movement about an axis adjacent the upper end of the chute to position its lower end below the rearward edge of the stationary plate, and the operating means for the intercepting means rocking the plate about its pivotal mounting to position its lower end in alignment with the rearward edge of the stationary plate.

5. Apparatus in accordance with claim 1 in which depending guides are provided to divide the upper end of the chute into the adjacent stalls and guide the loaves as they move longitudinally into the chute into spaced parallel relationship.

6. Apparatus in accordance with claim 5 in which the guide means are depending rods, a cross-bar overlying the first conveyor, and loops at the upper ends of the rods which loosely fit the cross-bar for pivotally mounting the rods to hang across the top of the conveyor and upper end of the chute and move freely on the cross-bar.

7. Apparatus in accordance with claim 1 in which the means at the lower end of the chute for receiving and conveying a group of loaves laterally comprises a table, a conveyor located on at least one side of the table, a flight bar extending across the table in a direction parallel to the chute, and means for operating the flight bar across the table in a direction at right angles to the chute to sweep successive groups of loaves from the table onto the conveyor.

8. Apparatus in accordance with claim 7 in which the means for operating the flight bar across the table comprises endless chains at each side of the table, brackets projecting upwardly from a link of each chain, the flight bar extending across the table between the brackets at a level above the top of the table, and means for driving the chains synchronously.

9. Apparatus in accordance with claim 7 in which a conveyor is provided at each side of the table, and driving means to reciprocate the flight bar in opposite directions across the table to deliver successive groups of loaves to the alternate conveyors at each side of the table.

10. Apparatus in accordance with claim 9 in which the flight bar is driven by a reversible motor, a limit switch adjacent each end of the table and connected to the motor to reverse its direction, a switch operator depending from one of the chains for operating a limit switch as the flight bar approaches each end of the table to reverse the direction of movement of the chains and flight bar.

11. Apparatus in accordance with claim 1 in which the means at the lower end of the chute for receiving and conveying a group of loaves laterally comprises a plurality of conveyor units, one of said conveyor units being pivotally mounted at one end, upper and lower conveyors adjacent the opposite end of the pivotally mounted conveyor, and operating means for raising and lowering the pivotally mounted conveyor for delivering loaves to the upper and lower conveyors selectively.

References Cited in the file of this patent

UNITED STATES PATENTS

| | | |
|---|---|---|
| 1,362,034 | Olson | Dec. 14, 1920 |
| 2,279,041 | Hadley | April 7, 1942 |
| 2,576,369 | Sticelber | Nov. 27, 1951 |
| 2,790,527 | Griffith | Apr. 30, 1957 |
| 2,801,728 | Temple | Aug. 6, 1957 |
| 2,829,758 | Temple | Apr. 8, 1958 |
| 2,877,883 | Lanham | Mar. 17, 1959 |
| 2,946,426 | Hartmann | July 26, 1960 |